United States Patent
Lee et al.

(10) Patent No.: US 8,750,600 B2
(45) Date of Patent: Jun. 10, 2014

(54) APPARATUS AND METHOD FOR GENERATING THREE-DIMENSIONAL (3D) ZOOM IMAGE OF STEREO CAMERA

(75) Inventors: Seung Kyu Lee, Seoul (KR); Hwa Sup Lim, Hwaseong-si (KR)

(73) Assignee: Samsung Electronics Co, Ltd., Suwon-Si (KR)

(*) Notice: Subject to any disclaimer, the term of this patent is extended or adjusted under 35 U.S.C. 154(b) by 55 days.

(21) Appl. No.: 13/398,360

(22) Filed: Feb. 16, 2012

(65) Prior Publication Data

US 2013/0011045 A1   Jan. 10, 2013

(30) Foreign Application Priority Data

Jul. 7, 2011  (KR) .................. 10-2011-0067268

(51) Int. Cl.
*G06K 9/00* (2006.01)
(52) U.S. Cl.
USPC ......................................................... 382/154
(58) Field of Classification Search
None
See application file for complete search history.

(56) References Cited

U.S. PATENT DOCUMENTS

| | | | | |
|---|---|---|---|---|
| 5,625,408 A * | 4/1997 | Matsugu et al. | ................. | 348/42 |
| 2005/0053274 A1* | 3/2005 | Mayer et al. | .................. | 382/154 |
| 2005/0089212 A1* | 4/2005 | Mashitani et al. | ............. | 382/154 |
| 2009/0190852 A1* | 7/2009 | Lim et al. | ....................... | 382/256 |
| 2010/0239240 A1* | 9/2010 | Cameron et al. | .............. | 396/325 |
| 2011/0018969 A1* | 1/2011 | Tanaka | ............................. | 348/47 |
| 2011/0292178 A1* | 12/2011 | Goma et al. | .................... | 348/46 |
| 2012/0242791 A1* | 9/2012 | Saito | ................................ | 348/43 |
| 2012/0308221 A1* | 12/2012 | Pace et al. | ...................... | 396/325 |
| 2012/0327197 A1* | 12/2012 | Yamashita et al. | .............. | 348/50 |

FOREIGN PATENT DOCUMENTS

| | | |
|---|---|---|
| JP | 2005-20559 | 1/2005 |
| JP | 2005-20606 | 1/2005 |
| JP | 2006-251683 | 9/2006 |
| JP | 2010-273333 | 12/2010 |
| JP | 2011-29700 | 2/2011 |
| JP | 2011-55022 | 3/2011 |
| KR | 10-2003-0048013 | 6/2003 |

\* cited by examiner

*Primary Examiner* — Vu Le
*Assistant Examiner* — Samah Beg
(74) *Attorney, Agent, or Firm* — Staas & Halsey LLP (57) ABSTRACT

An apparatus and method for generating a three-dimensional (3D) zoom image of a stereo camera are provided that may compute a baseline variation or a convergence angle that is associated with a magnification of a zoom image acquired from the stereo camera, may warp the zoom image using the computed baseline variation or the computed convergence angle, and may perform inpainting on the warped image to prevent a distortion of 3D information, so that a 3D zoom image may be generated without a distortion of 3D information using a zoom lens.

15 Claims, 8 Drawing Sheets

APPARATUS AND METHOD FOR GENERATING THREE-DIMENSIONAL (3D) ZOOM IMAGE OF STEREO CAMERA

CROSS-REFERENCE TO RELATED APPLICATIONS

This application claims the priority benefit of Korean Patent Application No. 10-2011-0067268, filed on Jul. 7, 2011, in the Korean Intellectual Property Office, the disclosure of which is incorporated herein by reference.

BACKGROUND

1. Field

Embodiments of the following description relate to a technology that may generate a three-dimensional (3D) zoom image.

2. Description of the Related Art

A conventional stereo three-dimensional (3D) camera generates a 3D zoom image using a scheme of generating 3D information by enlarging a left image and a right image that are obtained through zoom lenses respectively mounted in cameras of the conventional stereo 3D camera.

Figure 1:
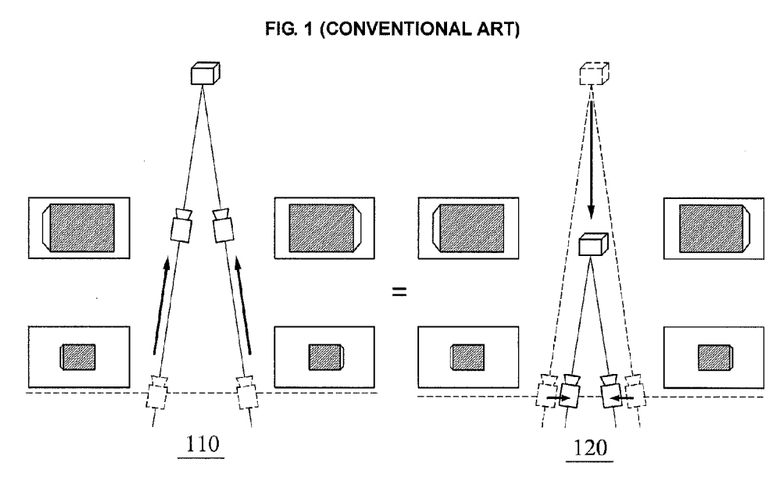
FIG. 1 illustrates a diagram of an example of a conventional scheme of acquiring a three-dimensional (3D) zoom image.

FIG. 1 illustrates a diagram of an example of a conventional scheme of acquiring a 3D zoom image.

As shown in a left view 110 of FIG. 1, a 3D zoom image may be acquired using only zoom lenses of a left camera and a right camera, without moving the left camera and right camera to the left or right. Specifically, to obtain the 3D zoom image, two-dimensional (2D) images acquired by the left camera and the right camera may be enlarged using only the zoom lenses, instead of moving the left camera and the right camera. In reality, an effect of acquiring an image of a distant object at a closer distance based on a magnification may be obtained similar to that shown in a right view 120 of FIG. 1. However, a baseline between the left camera and the right camera may be reduced.

Similarly, as shown in the right view 120, a 3D zoom image may be acquired using only zoom lenses of a left camera and a right camera. Due to the 3D zoom image of the right view 120, an image projected on a 2D image plane of each of the left camera and the right camera may be enlarged. As shown in the 3D zoom image of the right view 120, 3D information of a depth direction is not enlarged to the same size as a magnification of each of the zoom lenses. Specifically, when a 3D object, for example a box, is enlarged, a 3D structure of the 3D object needs to be enlarged by representing, in a 3D image, a side surface and a top surface of the box that were not shown before enlarging the 3D object. However, as a result of the conventional scheme, only 2D information obtained by projecting the 3D information of the depth direction on a 2D plane is enlarged. In other words, the conventional scheme results in enlargement of the image projected on the 2D image plane of each of the left camera and the right camera, however, fails to enlarge 3D information of an object to the same size as the magnification of each of the zoom lenses.

Additionally, due to characteristics of 3D information, when a distant object is zoomed in closer, a viewpoint from which each point of an image is observed may be changed. Accordingly, a 3D structure of a 3D object may be changed.

In other words, since a change of a 3D structure is not reflected to a conventional 3D zoom image, an image with a lower 3D effect of a zoomed 3D object may be obtained, or the 3D information may be distorted.

SUMMARY

According to aspects of one or more embodiments, there is provided an apparatus for generating a three-dimensional (3D) zoom image of a stereo camera, including an image acquiring unit to acquire a zoom image with a selected magnification from the stereo camera, an information computing unit to compute a baseline variation or a convergence angle, the baseline variation and the convergence angle being associated with the selected magnification, and an image warping unit to warp the zoom image using the computed baseline variation or the computed convergence angle.

The information computing unit may acquire at least one of a magnification-related distance associated with the selected magnification, and a previous baseline and a previous convergence angle that are measured before zooming at the selected magnification, and may compute the baseline variation or the convergence angle using the acquired at least one of the magnification-based distance, the previous baseline, and the previous convergence angle.

The information computing unit may compute the convergence angle by applying an arctangent function to the magnification-related distance and the previous convergence angle, or may compute the baseline variation using a difference value between the previous baseline and a value obtained by dividing the convergence angle by the previous convergence angle.

The apparatus may further include an information extracting unit to extract disparity information on a disparity between a right zoom image and a left zoom image that are acquired from a color camera associated with the stereo camera. The image warping unit may warp the zoom image based on the extracted disparity information so that the zoom image may have the baseline variation or the convergence angle.

The apparatus may further include an information extracting unit to extract depth information from a depth camera and the stereo camera. The image warping unit may warp the zoom image based on the extracted depth information so that the zoom image may have the baseline variation or the convergence angle.

The apparatus may further include an image inpainting unit to inpaint an occlusion area in the warped image, and to generate a 3D zoom image.

The image inpainting unit may inpaint the occlusion area bidirectionally using a foreground area and a background area of the warped image based on a volume prediction, and may generate the 3D zoom image.

According to aspects of one or more embodiments, there is provided a method for generating a three-dimensional (3D) zoom image of a stereo camera, the method including acquiring a zoom image with a selected magnification from the stereo camera, computing a baseline variation or a convergence angle, the baseline variation and the convergence angle being associated with the selected magnification, and warping the zoom image using the computed baseline variation or the computed convergence angle.

According to another aspect of one or more embodiments, there is provided at least one non-transitory computer readable medium storing computer readable instructions to implement methods of one or more embodiments.

Additional aspects will be set forth in part in the description which follows and, in part, will be apparent from the description, or may be learned by practice of the disclosure.

According to one or more embodiments, it is possible to generate a 3D zoom image in which 3D information is not distorted, by using zoom lenses of a stereo camera, without changing a structure of the stereo camera.

According to one or more embodiments, it is possible to easily acquire a 3D zoom image in which 3D information is not distorted, by adding a 3D zoom function to an apparatus such as a microscope in which a structure of a camera is difficult to be changed.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 2:
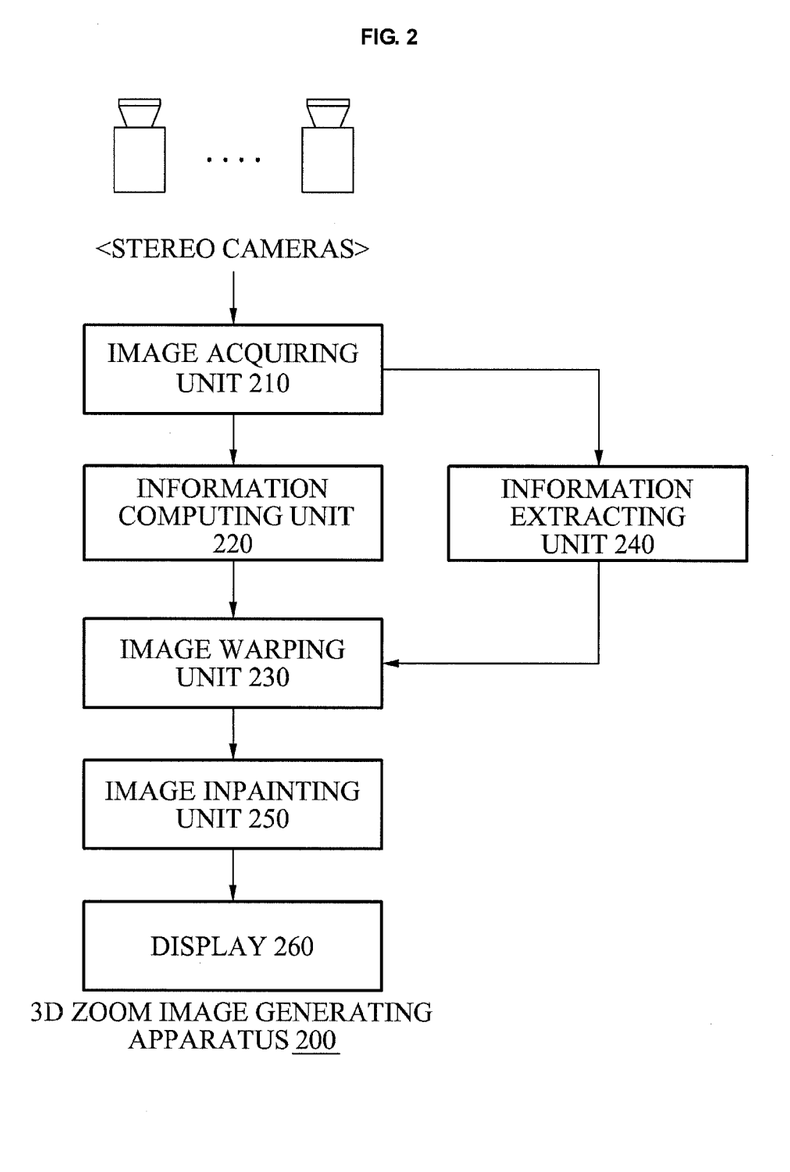
FIG. 2 illustrates a block diagram of a configuration of an apparatus for generating a 3D zoom image of a stereo camera according to an embodiment.

FIG. 2 illustrates a block diagram of a configuration of an apparatus for generating a three-dimensional (3D) zoom image of a stereo camera according to an embodiment.

Referring to FIG. 2, an apparatus 200 for generating a 3D zoom image of a stereo camera (hereinafter, referred to as a "3D zoom image generating apparatus 200") may include an image acquiring unit 210 (image acquirer), an information computing unit 220 (information computing device), an image warping unit 230 (image warper), an information extracting unit 240 (information extractor), and an image inpainting unit 250 (image inpainter). The apparatus 200 may further include a display 260.

The stereo camera refers to a camera that acquires an image by capturing an object using a left camera and a right camera of the stereo camera that are separated by a predetermined baseline to simulate human eyes.

The image acquiring unit 210 may acquire a zoom image with a selected magnification from the stereo camera. The selected magnification may be set to a magnification a user of the stereo camera desires to increase or reduce. Additionally, the zoom image may refer to an image obtained by zooming in on an object, namely a subject, at the selected magnification.

The information computing unit 220 may compute a baseline variation or a convergence angle. The baseline variation and the convergence angle may be associated with the selected magnification. A baseline may refer to a distance between cameras of the stereo camera based on an object, and the baseline variation may indicate an amount of a change in baseline between before and after zooming. Additionally, the convergence angle may refer to an angle between the object and a focal length of the stereo camera after adjusting the focal length of the stereo camera. In other words, the baseline of the stereo camera associated with the selected magnification may have a value obtained by summing the baseline variation and a previous baseline measured prior to the zooming.

To obtain the zoom image zoomed in at the selected magnification, the convergence angle or the baseline needs to be changed while zooming of lenses of the stereo camera is performed.

Figure 3:
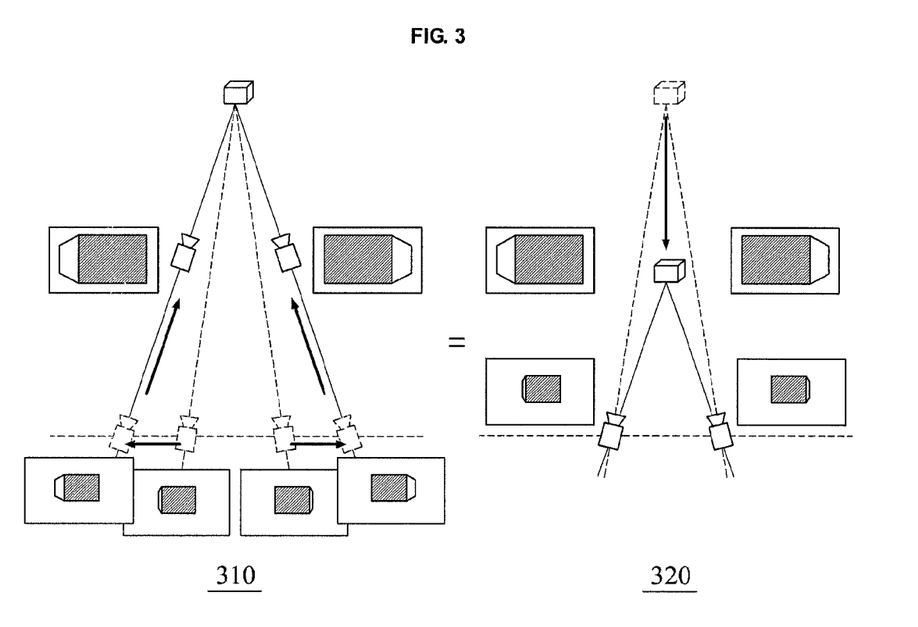
FIG. 3 illustrates a diagram of an example of changing a baseline or a convergence angle when a 3D zoom image is acquired according to an embodiment.

FIG. 3 illustrates a diagram of an example of changing a baseline or a convergence angle when a 3D zoom image is acquired according to an embodiment.

As shown in a left view 310 of FIG. 3, when objects, indicated by boxes, are fixed, a stereo camera may be moved to acquire a 3D zoom image. Specifically, to acquire a 3D zoom image at a 2× magnification, a baseline of the stereo camera at a 1× magnification may need to be doubled. In other words, a correct 3D zoom effect may be obtained by increasing the baseline based on an increase in a zoom magnification. However, a lens axis of each of cameras of the stereo camera needs to be dynamically changed, and a baseline between the cameras may restrict the zoom magnification, which may cause a problem.

In other words, to acquire a conventional 3D zoom image, a current baseline may be represented as a multiplication of a previous baseline by a zoom magnification.

For example, when an actual binocular parallax (for example, 7 centimeters (cm)) is set as a baseline of a stereo camera, the baseline may have a maximum value of '70 cm' to perform zooming at a 10× magnification. Generally, considering that the stereo camera is the same type of equipment such as a digital camera, or a microscope, a problem may occur in a size of the stereo camera, in addition to a problem of instability of equipment caused by a change in an optical axis. Additionally, when the stereo camera is used as a camera for broadcasting to acquire a 3D image, and when an actual baseline of the stereo camera corresponds to '50 cm,' a gap of '5 meters (m)' may be set to perform zooming at the 10× magnification.

However, in reality, it is almost impossible to set a baseline between cameras to be '5 m' and to generate a 3D zoom image. Accordingly, there is a need to achieve the same effect as if the baseline is changed in proportion to the zoom magnification, without a change in structure or position of the stereo camera.

As shown in a right view 320 of FIG. 3, a 3D zoom image, similar to the 3D zoom image of the left view 310, may be acquired using zoom lenses of a stereo camera. Due to characteristics of 3D information, when a distant object is zoomed in closer, a viewpoint from which each point of an image is observed may be changed, which may result in a change of a 3D structure of a 3D object.

Figure 4:
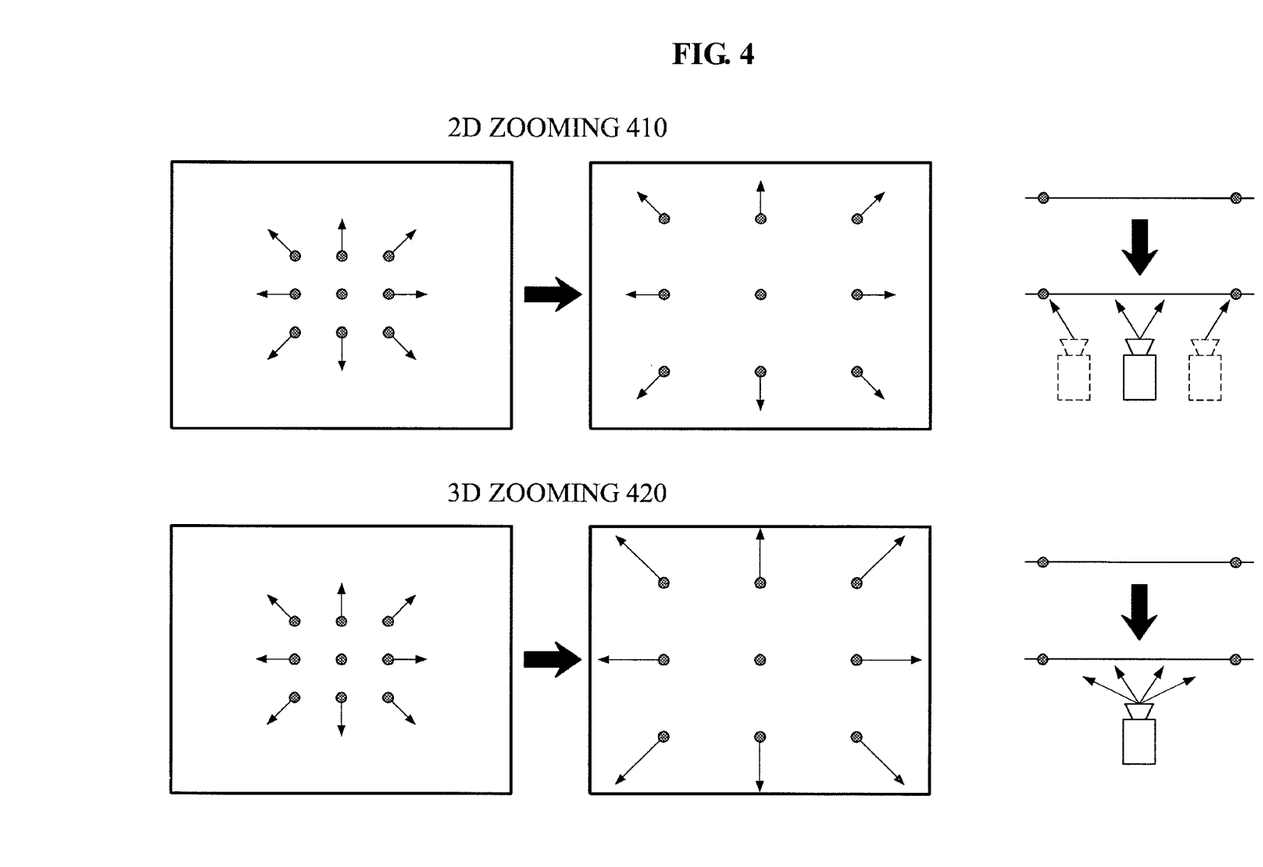
FIG. 4 illustrates a diagram of an example of a change in viewpoint for each pixel in an image where two-dimensional (2D) zooming and 3D zooming are performed according to an embodiment.

FIG. 4 illustrates a diagram of an example of a change in viewpoint for each pixel in an image where 2D zooming and 3D zooming are performed according to an embodiment.

Referring to FIG. 4, 2D zooming 410 may enable an image to be enlarged with a change in only positions of pixels in the image, not viewpoints of the pixels. In other words, the 2D zooming 410 may lead to generation of a distorted image that may not be actually viewed from a single camera.

Conversely, when 3D zooming 420 is performed, an image may need to be enlarged by changing viewpoints of pixels in the image, as well as positions of the pixels. Specifically, the 3D zooming 420 may need to enable the viewpoints of the pixels to be changed while changing a focal length of a camera based on a movement of an object, to prevent 3D information of an acquired image from being distorted.

For example, when a 3D object is zoomed in using a zoom lens at a selected magnification, a focal length of a stereo camera focused on the 3D object may be changed and accordingly, both a baseline of the stereo camera and a convergence angle based on the changed focal length may need to be changed.

Figure 5:
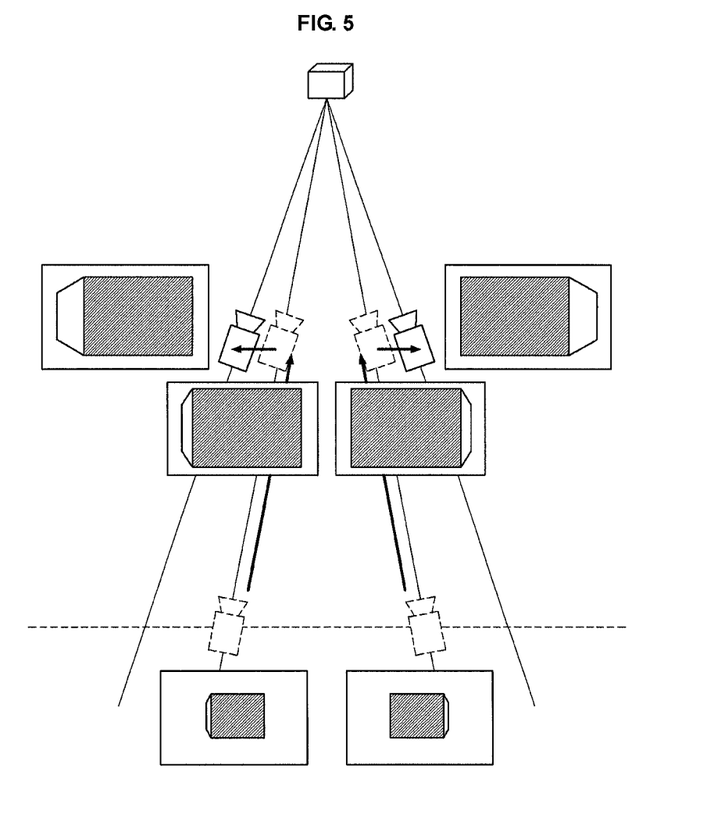
FIG. 5 illustrates a diagram of an example of changing a baseline or a convergence angle to acquire a 3D zoom image according to an embodiment.

FIG. 5 illustrates a diagram of an example of changing a baseline or a convergence angle to acquire a 3D zoom image according to an embodiment.

Referring to FIG. 5, a baseline of a stereo camera may be increased by a movement distance (namely, a baseline variation) that is required based on a zoom magnification, and a convergence angle may also be changed by changing a focal length of the stereo camera, and thus it is possible to acquire a 3D zoom image without a distortion of 3D information.

However, in reality, it is difficult to generate a 3D zoom image by changing a structure of a stereo camera. Accordingly, there is a desire for a function of easily acquiring a 3D zoom image without a distortion of 3D information, as shown in FIG. 5, by changing a structure of an actual camera based on a change in baseline or convergence angle in proportion to a zoom magnification, while minimizing a change in structure of the stereo camera. In other words, there is a need to apply the same effect as if 3D zooming is performed on the stereo camera using a baseline variation or convergence angle computed based on the zoom magnification.

Figure 6:
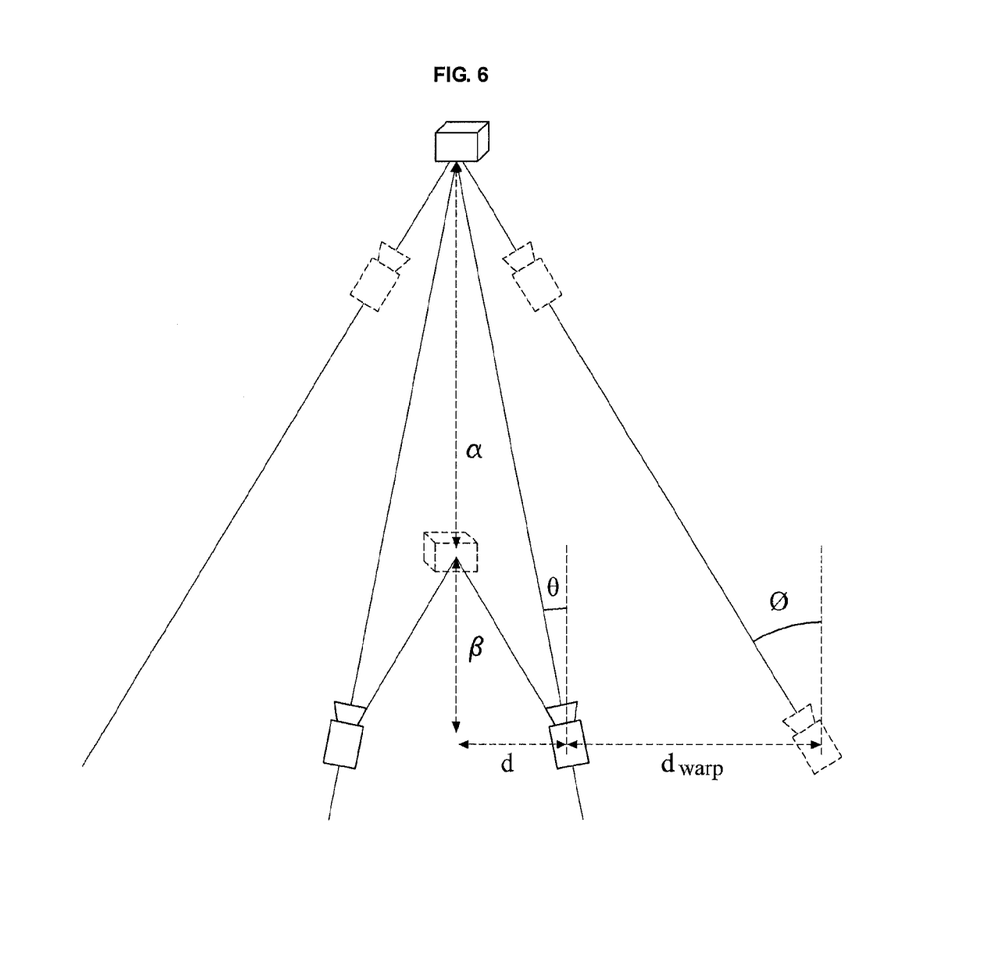
FIG. 6 illustrates a diagram of an example of computing a baseline variation or a convergence angle according to example embodiments.

FIG. 6 illustrates a diagram of an example of computing a baseline variation or a convergence angle according to an embodiment.

Referring to FIG. 6, a solid-line box indicates an actual object, and a dotted-line box indicates an object that appears on an image obtained by enlarging the actual object through zoom lenses of a stereo camera. Additionally, "d" indicates a baseline measured when the stereo camera captures the actual object. For example, "d" may denote a baseline measured when lenses of the stereo camera have a 1× magnification. Furthermore, "α+β" indicates a distance between the actual object and the stereo camera.

The image acquiring unit 210 may acquire a zoom image from a stereo camera by enlarging an object to a selected magnification that is desired by a user. The 3D zoom image generating apparatus 200 may compute a baseline variation or a convergence angle that may be changed based on the selected magnification. The 3D zoom image generating apparatus 200 may warp the acquired zoom image using the computed baseline variation or the computed convergence angle, so as to achieve the same effect as if the baseline or the convergence angle is actually changed.

Accordingly, the information computing unit 220 may acquire a magnification-related distance $$\frac{\alpha + \beta}{\beta}$$

associated with the selected magnification, and a previous baseline "d" or a previous convergence angle "θ." The previous baseline "d" and the previous convergence angle "θ" may be measured before zooming at the selected magnification. The previous baseline "d" and the previous convergence angle "θ" may correspond to a 1× magnification of the stereo camera. In other words, the information computing unit 220 may obtain the previous baseline "d" and the previous convergence angle "θ" based on a structural relationship between the stereo camera and the object before the zooming.

As illustrated in FIG. 6, the previous convergence angle "θ" may be represented as $$\tan\theta = \frac{d}{\alpha + \beta},$$

and a convergence angle "φ" to be computed may be represented as $$\tan\Phi = \frac{d}{\beta}.$$

The information computing unit 220 may compute the convergence angle "φ" by applying an arctangent function to the magnification-related distance $$\frac{\alpha + \beta}{\beta}$$

and the previous convergence angle "θ." The convergence angle "φ" may be represented as shown in Equation 1.

$$\Phi = \arctan\left(\frac{\alpha + \beta}{\beta} \times \tan\theta\right) \qquad \text{Equation 1}$$
$$= \arctan(K \times \tan\theta)$$

In Equation 1, a variable K denotes a magnification-related distance, and may be represented as $$K = \frac{\alpha + \beta}{\beta}.$$

Additionally, the convergence angle "φ" may be represented as $$\tan\Phi = \frac{d + d_{warp}}{\alpha + \beta}$$

in which $d_{warp}$ denotes a baseline variation to be computed. The information computing unit 220 may compute the baseline variation "$d_{warp}$" using a difference value between the previous baseline "d" and a value obtained by dividing the computed convergence angle "tan φ" by the previous convergence angle "tan θ." Accordingly, the baseline variation $d_{warp}$ may be represented as shown in Equation 2.

$$d_{warp} = d\left(\frac{\tan \Phi}{\tan \theta} - 1\right) \quad \text{Equation 2}$$

The image warping unit 230 may warp the zoom image based on the computed baseline variation or the computed convergence angle. Specifically, the image warping unit 230 may warp the zoom image so that the zoom image may have the baseline variation or the convergence angle and thus, it is possible to achieve the same effect as if a zoom image is obtained by actually changing the baseline or the convergence angle. For example, a baseline of the stereo camera measured after zooming may have a value obtained by summing the previous baseline "d" and the baseline variation "$d_{warp}$."

As an example, the information extracting unit 240 may extract disparity information on a disparity between a right zoom image and a left zoom image that are acquired from a color camera associated with the stereo camera. The disparity information may indicate a disparity between the same pixels in the right zoom image and the left zoom image. Additionally, the information extracting unit 240 may extract depth information from a depth camera and the stereo camera.

The image warping unit 230 may warp the zoom image based on the extracted disparity information, so that the zoom image may have the baseline variation or the convergence angle. Also, the image warping unit 230 may warp the zoom image based on the extracted depth information, so that the zoom image may have the baseline variation or the convergence angle.

However, the warped image may include an occlusion area. Due to the occlusion area, a 3D effect of a zoomed 3D object may be reduced, or 3D information may be distorted. Accordingly, the occlusion area may be required to be corrected through image inpainting.

The image inpainting unit 250 may inpaint the occlusion area in the warped image bidirectionally using a foreground area and a background area of the warped image based on a volume prediction, and may generate the 3D zoom image.

As described above, the 3D zoom image generating apparatus 200 may warp an image using an existing function of enlarging the image using zoom lenses of a stereo camera, and may inpaint an occlusion area in the warped image, without actually changing a baseline of the stereo camera or a convergence angle. Thus, it is possible to achieve the same effect as if the baseline or the convergence angle is changed.

Figure 7:
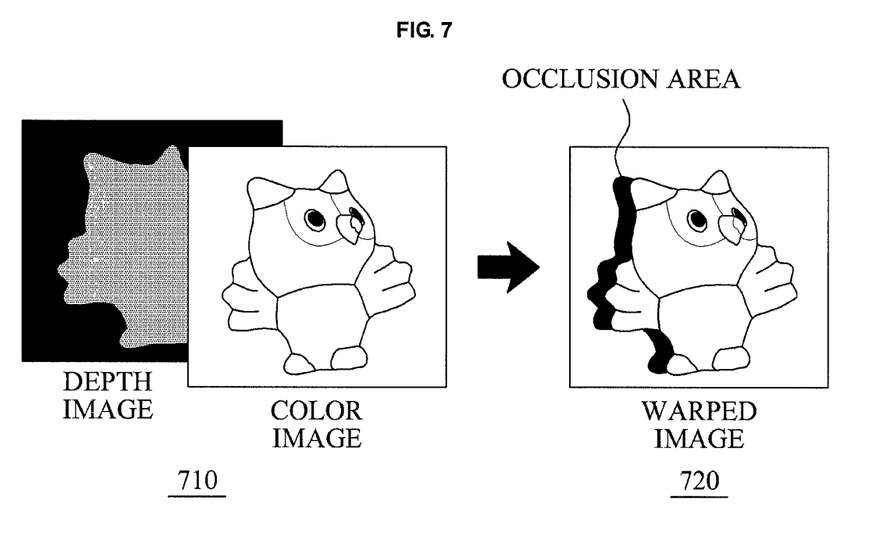
FIG. 7 illustrates a diagram of an example of inpainting an occlusion area in a warped image according to an embodiment.

FIG. 7 illustrates a diagram of an example of inpainting an occlusion area in a warped image according to an embodiment.

As shown in a left view 710 of FIG. 7, a depth image and a color image may be acquired by a stereo camera. When the depth image and the color image are warped to have a computed baseline variation or computed convergence angle, a warped image 720 may be obtained. However, since an occlusion area appears in black on the warped image 720, a 3D effect of an object, for example a bird of FIG. 7, may be reduced, and 3D information may be distorted.

Accordingly, the image inpainting unit 250 may inpaint the occlusion area in the warped image 720 using a conventional image inpainting scheme, and may generate a 3D zoom image. The generated 3D zoom image may show a 3D effect of the zoomed object, without a distortion of 3D information.

Figure 8:
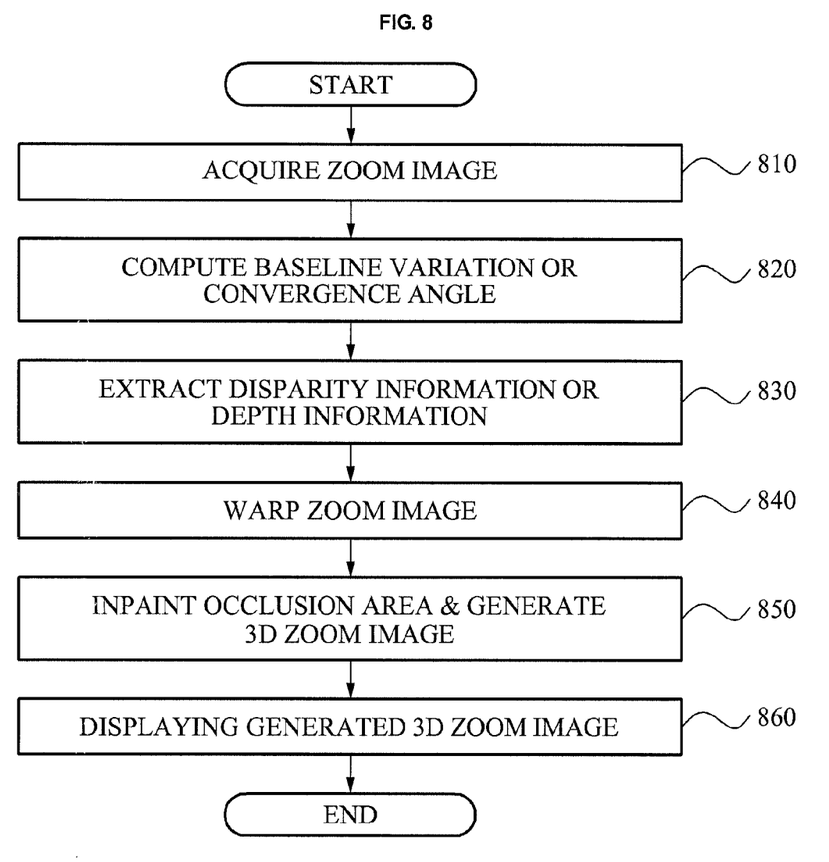
FIG. 8 illustrates a flowchart of a method for generating a 3D zoom image of a stereo camera according to an embodiment.

FIG. 8 illustrates a flowchart of a method for generating a 3D zoom image of a stereo camera according to an embodiment.

Referring to FIG. 8, in operation 810, a zoom image with a selected magnification may be acquired from a stereo camera. The selected magnification may be set to a magnification a user of the stereo camera desires to increase or reduce.

In operation 820, a baseline variation or a convergence angle may be computed. The baseline variation and the convergence angle may be associated with the selected magnification. The convergence angle "φ" may refer to an angle between an object and a focal length of the stereo camera after adjusting the focal length of the stereo camera. For example, an arctangent function may be applied to the magnification-related distance $$\frac{\alpha + \beta}{\beta}$$

and the previous convergence angle "tan θ", and the convergence angle "φ" may be computed. In other words, the convergence angle "φ" may be computed using the above-described Equation 1.

A baseline may refer to a distance between cameras of the stereo camera based on an object. Additionally, the baseline variation may indicate an amount of a change in baseline between before and after zooming. For example, the baseline variation "$d_{warp}$" may be computed using a difference value between the previous baseline "d" and a value obtained by dividing the computed convergence angle "tan φ" by the previous convergence angle "tan θ." In other words, the baseline variation "$d_{warp}$" may be computed using the above-described Equation 2.

In operation 830, disparity information or depth information associated with the zoom image may be extracted. The disparity information may indicate a disparity between the same pixels in a right zoom image and a left zoom image that are acquired from a color camera associated with the stereo camera. Additionally, the depth information may be extracted from a depth camera associated with the stereo camera.

In operation 840, the zoom image may be warped based on the disparity information or the depth information so that the zoom image may have the baseline variation or the convergence angle. Accordingly, it is possible to achieve the same effect as if a zoom image is obtained by actually changing the baseline or the convergence angle, by warping the zoom image so that the zoom image may have the computed baseline variation or the computed convergence angle, without changing a structure of the stereo camera or moving the stereo camera.

However, the warped image may include an occlusion area in which 3D distortion occurs. The occlusion area may cause a 3D effect of a zoomed 3D object to be reduced, or cause 3D information to be distorted.

In operation 850, the occlusion area in the warped image may be inpainted, and a 3D zoom image may be generated. In an example, the occlusion area in the warped image may be inpainted bidirectionally using a foreground area and a background area of the warped image based on a volume prediction, so that the 3D zoom image may be generated.

In operation 860, the generated 3D zoom image may be displayed.

The methods according to the above-described embodiments may be recorded in non-transitory computer-readable media including program instructions (computer readable instructions) to implement various operations embodied by executing computer readable instructions to control one or more processors of a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts.

Examples of non-transitory computer-readable media include magnetic media such as hard disks, floppy disks, and magnetic tape; optical media such as CD ROMs and DVDs; magneto-optical media such as optical disks; and hardware devices that are specially configured to store and perform program instructions, such as read-only memory (ROM), random access memory (RAM), flash memory, and the like. Examples of computer readable instructions include both machine code, such as produced by a compiler, and files containing higher level code that may be executed by the computer using an interpreter. The described hardware devices may be configured to act as one or more software modules in order to perform the operations of the above-described embodiments, or vice versa. Another example of media may also be media in a distributed network, so that the computer readable instructions are stored and executed in a distributed fashion.

The computer-readable media may also be embodied in at least one application specific integrated circuit (ASIC) or Field Programmable Gate Array (FPGA), which executes (processes like a processor) computer readable instructions.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. An apparatus for generating a three-dimensional (3D) zoom image of a stereo camera, the apparatus comprising:
    an image acquirer configured to acquire a zoom image with a selected magnification from the stereo camera;
    an information computer configured to compute a convergence angle, the convergence angle being associated with the selected magnification;
    an image warper configured to warp the zoom image using the computed convergence angle without moving the stereo camera; and
    an image inpainter configured to inpaint an occlusion area in the warped image, and to generate the 3D zoom image,
    wherein the image acquirer, the image warper, and the image inpainter use at least one processor.

2. The apparatus of claim 1, wherein the information computer is configured to acquire at least one of a magnification-related distance associated with the selected magnification and a previous convergence angle that is measured before zooming at the selected magnification, and computes the convergence angle using the acquired at least one of the magnification-related distance and the previous convergence angle.

3. The apparatus of claim 2, wherein the information computer is configured to compute the convergence angle by applying an arctangent function to the magnification-related distance and the previous convergence angle.

4. The apparatus of claim 1, further comprising:
    an information extractor configured to extract disparity information on a disparity between a right zoom image and a left zoom image, the right zoom image and the left zoom image being acquired from a color camera associated with the stereo camera,
    wherein the image warper is configured to warp the zoom image based on the extracted disparity information so that the zoom image has the convergence angle, and
    wherein the information extractor uses at least one processor.

5. The apparatus of claim 1, further comprising:
    an information extractor configured to extract depth information from a depth camera and the stereo camera,
    wherein the image warper is configured to warp the zoom image based on the extracted depth information so that the zoom image has the convergence angle, and
    wherein the information extractor uses at least one processor.

6. The apparatus of claim 1, wherein the image inpainter is configured to inpaint the occlusion area bidirectionally using a foreground area and a background area of the warped image based on a volume prediction, and generates the 3D zoom image.

7. The apparatus of claim 1, further comprising a display to display the generated 3D zoom image.

8. A method for generating a three-dimensional (3D) zoom image of a stereo camera, the method comprising:
    acquiring a zoom image with a selected magnification from the stereo camera;
    computing a convergence angle, the convergence angle being associated with the selected magnification;
    warping the zoom image using the computed convergence angle without moving the stereo camera; and
    inpainting an occlusion area in the warped image, and generating the 3D zoom image.

9. The method of claim 8, wherein the computing comprises:
    acquiring at least one of a magnification-related distance associated with the selected magnification and a previous convergence angle, the previous convergence angle being measured before zooming at the selected magnification; and
    computing the convergence angle using the acquired at least one of the magnification-related distance and the previous convergence angle.

10. The method of claim 9, wherein the computing comprises computing the convergence angle by applying an arctangent function to the magnification-related distance and the previous convergence angle.

11. The method of claim 8, further comprising:
    extracting disparity information on a disparity between a right zoom image and a left zoom image, the right zoom image and the left zoom image being acquired from a color camera associated with the stereo camera,
    wherein the warping comprises warping the zoom image based on the extracted disparity information so that the zoom image has the convergence angle.

12. The method of claim 8, further comprising:
    extracting depth information from a depth camera and the stereo camera,
    wherein the warping comprises warping the zoom image based on the extracted depth information so that the zoom image has the convergence angle.

13. The method of claim 8, wherein the inpainting comprises inpainting the occlusion area bidirectionally using a foreground area and a background area of the warped image based on a volume prediction, and generating the 3D zoom image.

14. The method of claim 8, further comprising displaying the 3D zoom image on a display.

15. At least one non-transitory computer readable medium storing computer readable instructions that control at least one processor to implement the method of claim 8.

* * * * *